Figure 1:
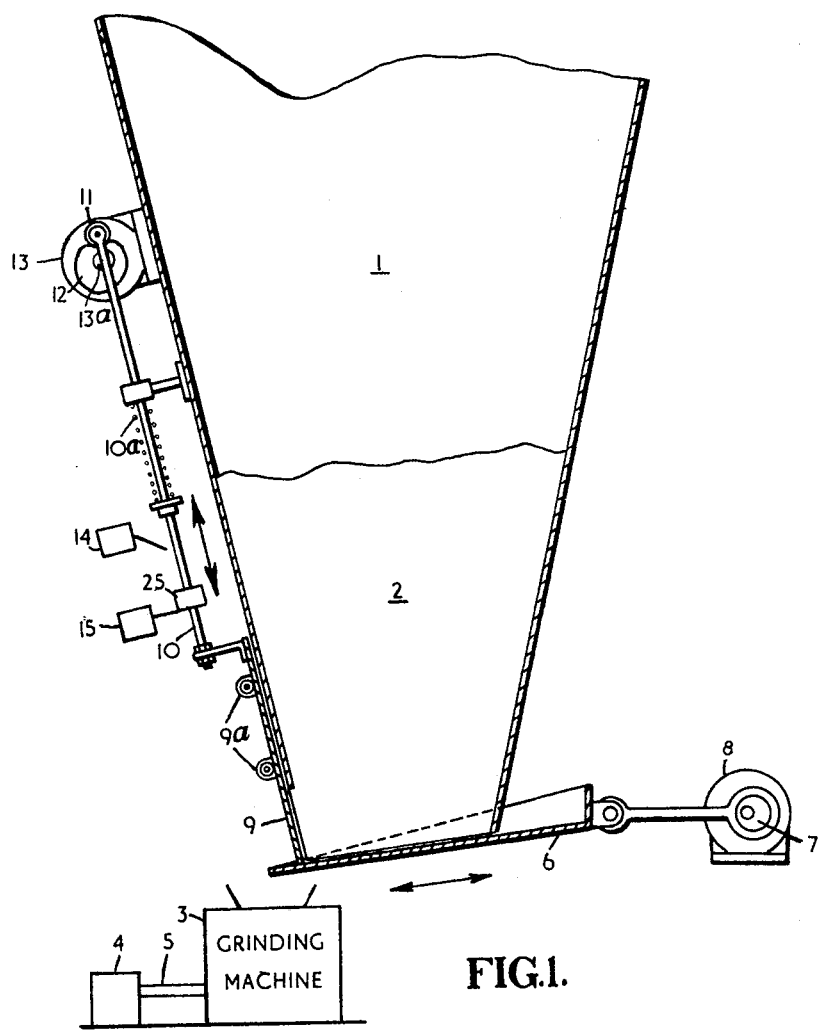

United States Patent Office 3,157,365
Patented Nov. 17, 1964

3,157,365
AUTOMATIC CONTROL OF MATERIALS PROCESSING MACHINES
Thomas J. A. Brown, Buxton, and Philip Hunter Wolfenden, Coventry, England, assignors to Henry Simon Limited, Stockport, England, a British company
Filed Jan. 19, 1962, Ser. No. 167,248
Claims priority, application Great Britain, Jan. 20, 1961, 2,336/61
4 Claims. (Cl. 241—35)

This invention relates to means for automatically controlling the operation of materials processing machines hereinafter referred to as grinding machines or grinders, and is particularly directed to means whereby the input feed of material to a grinding machine is automatically regulated in accordance with the load which it imposes on the grinding machine driving motor.

It is known to employ control means in which the electrical power dissipated by the grinder driving motor is monitored by apparatus ararnged so that when the driving current for the said motor rises above or falls below the limits of a predetermined working current range, control means are actuated to alter the rate of feed of materials to a condition where the grinder current is within the desired range. The said feed control means incorporate control switches whereby a feed-rate control motor of a reversible type can be caused to rotate at a constant speed in a desired direction to effect an adjustment of the feed-rate determining mechanism of a feeding element, which feeding element may be of a type wherein the rate of feed varies in accordance with the speed of a rotating member driven through the intermediary of an infinitely variable speed gear (as for example a worm conveyor or a rotary cell wheel or a fixed amplitude vibrator), or may be of a gated hopper type having a feed-rate which varies in accordance with the amount by which a feed gate is opened, or may be of a constant-frequency variable amplitude vibratory type wherein the rate of feed varies in accordance with mechanically effected changes in the amplitude of vibration of a vibrating element. The said feed control means may also include switch gear for engaging or disengaging the driving means of the feeding element (or starting or stopping its driving motor), if the grinder driving motor current reaches operational boundary limits outside the predetermined working current range.

With any arrangement of the kinds of apparatus described, it is desirable to provide for the limits of the working current range to be set so that fluctuating current changes due to local irregularities in the nature of the material being processed do not cause actuation of the feed-rate change mechanism, but further widening of the working current range to permit of the processing of a variety of materials of different natures, has the disadvatage of correspondingly narrowing the feed-rate adjustment zones which lie between the current range boundary limits and the limits of the working current range, and it is generally impossible to compensate for such narrowing of the adjustment zones by increasing the speed of adjustment of the feed-rate determining mechansm because, owing to the inherent time-lag between a change of rate of feed and a corresponding change in the grinder driving motor current, rapid adjustment conditions induce a tendency to overcorrect and thus cause continuous "hunting."

The object of the present invention is to provide improved feed regulating means which permit feed control means of the kinds described to regulate the rates of feed of a wider variety of materials of different natures than has hitherto been possible.

According to the invention, in a feed control means of the kind described, the reversible feed-rate control motor imparts its motion to the feed-rate determining mechanism through the intermediary of a cam (or cam operated linkage) so shaped and arranged that the feed-rate determining mechanism is caused to adjust the feeding element to provide that for each successive equal increment of adjustment time, the rate of change of feed-rate is directly proportional to the feed-rate applying at that time so that in conditions where the feed-rate is near its maximum the quantative effect of changes in feed-rate per increment of time will be comparatively large whereas feed-rate changes when the rate is near its minimum will produce comparatively small changes in the quantity of material fed in similar increments of time.

Referring to the accompanying drawings:
FIGURE 1 is a part sectional part schematic view of a feed control means in accordance with the invention for a grinding machine, and
FIGURE 2 is a circuit diagram of an electrical control circuit which may be used in conjunction with the means shown in FIGURE 1.

The feed means shown comprises a hopper 1 in which is material 2 to be ground in a grinding machine 3 (shown schematically) which is driven by an electric motor 4 via a shaft 5. The bottom of the hopper is closed by a constant speed, constant amplitude vibrating hopper 6 which is driven by an eccentric 7 on the shaft of an electric motor 8. The vibrating hopper 6 feeds the material 2 into the grinding machine 3 under the control of a feed gate 9 which is held in sliding association with the hopper 1 by roller grids 9a and is actuated by a control rod 10 having a cam follower 11 which is held by a spring 10a in close association with a cam 12 secured on the shaft 13a of a low geared electric motor 13. The range of rotation of the cam 12 corresponding to the feed gate 9 moving from a fully closed condition to a fully open condition, is about 160 degrees. Over this range the cam profile is arranged so that the rate of change of feed for a given small angular movement of the cam is proportional to the mean feed rate at that time. Thus at lower feed rates the rate of change is small whereas at high feed rates the rate of change is great for any given angular movement of the cam.

Control rod 10 also carries a trip collar 25 which at the closed position of a feed gate 9 operates a limit switch 15 to open its contacts and in the open position of the feed gate opens the contacts of another limit switch 14.

Figure 2:
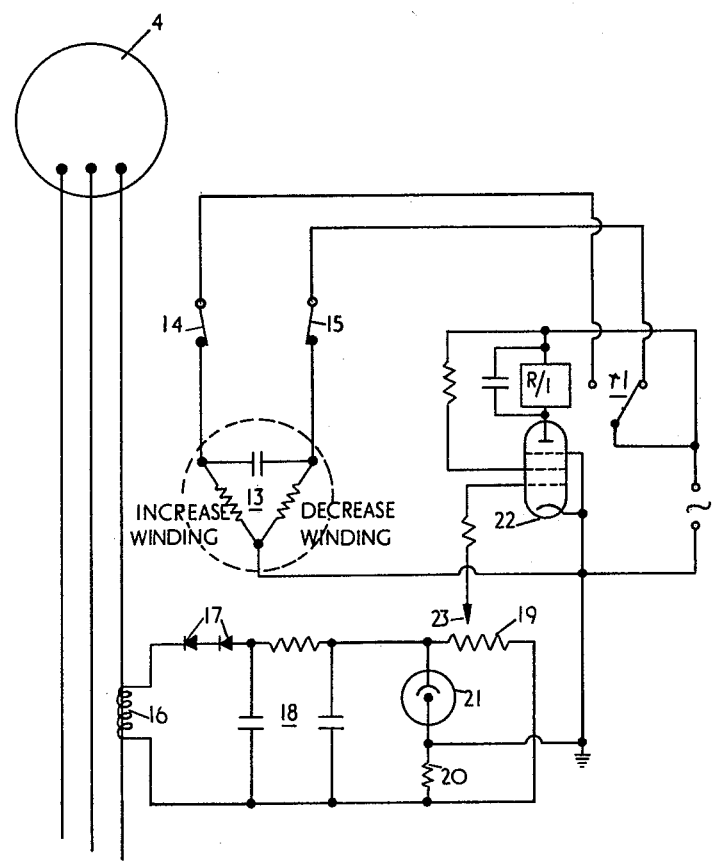

The feed gate actuating motor 13 is controlled by the electric circuit shown in FIGURE 2, in accordance with the electric current flowing in the power circuit of driving motor 4 of the griding machine. This current is monitored by a current transformer 16, the output of which is rectified by rectifiers 17 and smoothed by filter 18 to give a D.C. voltage corresponding to the current in the circuit of motor 4. The D.C. voltage is applied to a bridge network comprising, gas discharge tube 21, resistor 20, and the potentiometer 19, the latter having its slider 23 preset to a desired condition so that variations in the input voltage will produce changes in the grid biasing conditions affecting the operation of pentode valve 22. In normal conditions, the D.C. voltage corresponding to the driving motor current is insufficient to cut-off the pentode 22, and a relay R/1 in the anode circuit is energised so that changeover contacts r1 close the circuit to drive the control motor 13 to open the feed gate 9 unless the limit switch 14 is opened by the gate already being fully open.

When the current of the driving motor exceeds a predetermined value, the voltage applied to the control grid of pentode 22 reduces the anode current sufficiently to de-energise relay R/1, causing contacts r1 to close the circuit via switch 15 to energise the motor 13 in a direction to close the feed gate 9 thereby decreasing the feed rate. Limit switch 15 opens the circuit motor 13 when the feed gate 9 is fully closed. When the driving motor current becomes less due to decreased feed, relay R/1 is again energised and the feed rate is again increased. Thus there is a continuous adjustment of feed around that which produces a proper loading current for the grinding motor.

What we claim is:

1. A feed control means for automatically controlling the operation of material processing machines wherein a reversible feed-rate control motor has its output shaft rotatively coupled to a cam on which rides a cam follower coupled to a feed-rate determining mechanism, said cam having a cam surface which, along its periphery, changes in radial distance from its rotative centre, said changes in radial distance being such that for each successive equal movement of the cam the rate of change of feed-rate provided by the feed-rate determining mechanism, is directly proportional to the feed-rate applying at the time.

2. A feed control means for automatically controlling the operation of material processing machines wherein a reversible feed-rate control motor has its output shaft rotatively coupled to a cam on which rides a cam follower coupled to a feed-rate determining mechanism, said cam having a cam surface which along its periphery changes in radial distance from its rotative centre, the rate of change of radial distance at any point on the periphery being directly proportional to the radial distance at that point on the periphery.

3. The combination of a feed control means as claimed in claim 1 and an electric motor driven grinding machine, further comprising circuit means for determining the current in the grinding machine drive motor circuit and controlling the feed-rate control motor in a direction to increase or decrease the feed-rate according to whether the girnding motor current is respectievly below or above a predetermined value of current.

4. The combination of a feed control means as claimed in claim 2 and an electric motor driven grinding machine, further comprising circuit means for determining the current in the grinding machine drive motor circuit and controlling the feed-rate control motor in a direction to increase or decrease the feed-rate according to whether the grinding motor current is respectively below or above a predetermined value of current.

References Cited in the file of this patent

UNITED STATES PATENTS

| | | |
|---|---|---|
| 2,613,878 | Hailey | Oct. 14, 1952 |
| 2,753,122 | Nauta | July 3, 1956 |
| 2,843,327 | Nickle | July 15, 1958 |